United States Patent
Watanabe et al.

(10) Patent No.: US 9,358,970 B2
(45) Date of Patent: Jun. 7, 2016

(54) VEHICLE

(71) Applicant: TOYOTA JIDOSHA KABUSHIKI KAISHA, Toyota-shi, Aichi-ken (JP)

(72) Inventors: Masato Watanabe, Nagoya (JP); Yuki Hiura, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/694,182

(22) Filed: Apr. 23, 2015

(65) Prior Publication Data

US 2015/0307078 A1 Oct. 29, 2015

(30) Foreign Application Priority Data

Apr. 28, 2014 (JP) ................. 2014-092689

(51) Int. Cl.
*B60L 15/34* (2006.01)
*B60W 10/08* (2006.01)
*H02P 27/08* (2006.01)
*H02P 29/00* (2016.01)
*H02K 11/00* (2016.01)
*B60L 3/00* (2006.01)
(Continued)

(52) U.S. Cl.
CPC .............. *B60W 10/08* (2013.01); *B60L 3/0061* (2013.01); *B60L 7/14* (2013.01); *B60L 11/005* (2013.01); *B60L 11/1803* (2013.01); *H02K 11/0015* (2013.01); *H02K 11/0042* (2013.01); *H02K 11/0047* (2013.01); *H02K 11/21* (2016.01); *H02K 11/24* (2016.01); *H02K 11/25* (2016.01); *H02P 27/085* (2013.01); *H02P 29/0022* (2013.01); *B60L 2220/14* (2013.01); *B60L 2240/12* (2013.01); *B60L 2240/36* (2013.01); *B60L 2240/421* (2013.01); *B60L 2240/423* (2013.01); *B60L 2260/44* (2013.01); *B60W 2510/08* (2013.01); *F04C 29/02* (2013.01)

(58) Field of Classification Search
USPC ................................ 310/66, 68 R, 72; 701/22
See application file for complete search history.

(56) References Cited

U.S. PATENT DOCUMENTS 4,831,322 A * 5/1989 Mashino ................. H02J 7/245
322/28
4,840,719 A * 6/1989 Jasinski ................. G01N 17/02
134/42

(Continued)

FOREIGN PATENT DOCUMENTS

JP 2005-006466 A 1/2005
JP 2008-539682 A 11/2008

(Continued)

*Primary Examiner* — Thomas Tarcza
*Assistant Examiner* — Richard Goldman
(74) *Attorney, Agent, or Firm* — Oliff PLC

(57) ABSTRACT

A vehicle comprises a rotary electric machine, an inverter and an electronic control unit. The inverter is configured to supply current to the rotary electric machine. The electronic control unit is configured to set a control mode of the inverter to a first mode on a condition that the electronic control unit determines that there is no possibility of occurrence of the electrolytic corrosion. The electronic control unit configured to set the control mode of the inverter to a second mode and maintain output of the rotary electric machine at user request output on a condition that the electronic control unit determines that there is a possibility of occurrence of the electrolytic corrosion. The second mode is a mode in which occurrence of the electrolytic corrosion is further suppressed compared to the first mode.

4 Claims, 3 Drawing Sheets

(51) Int. Cl.
   *B60L 7/14*   (2006.01)
   *B60L 11/00*  (2006.01)
   *B60L 11/18*  (2006.01)
   *F04C 29/02*  (2006.01)

(56) References Cited

U.S. PATENT DOCUMENTS

| | | | | |
|---|---|---|---|---|
| 5,672,050 | A * | 9/1997 | Webber | F04B 49/022 417/18 |
| 6,075,299 | A * | 6/2000 | Miyazaki | H02K 11/0089 174/51 |
| 8,525,374 | B2 * | 9/2013 | Mizukami | H02K 11/0047 310/43 |
| 2005/0001566 | A1 * | 1/2005 | Bell | B66F 11/044 318/16 |
| 2006/0125493 | A1 * | 6/2006 | Subramanian | G01N 17/04 324/700 |
| 2008/0246422 | A1 * | 10/2008 | Fich | H02P 5/68 318/85 |
| 2010/0092118 | A1 * | 4/2010 | Mikami | C10M 169/00 384/462 |
| 2010/0253158 | A1 * | 10/2010 | Mizukami | H02K 5/08 310/43 |
| 2011/0240893 | A1 * | 10/2011 | Windgassen | H02K 5/1675 251/129.13 |
| 2013/0038182 | A1 * | 2/2013 | Obata | H02K 11/0089 310/68 R |
| 2013/0175012 | A1 * | 7/2013 | Yamada | H02K 11/0047 165/121 |
| 2014/0376845 | A1 * | 12/2014 | Takezoe | C22C 19/03 384/279 |
| 2015/0028708 | A1 * | 1/2015 | Matsuoka | H02K 1/278 310/156.07 |
| 2015/0307078 | A1 * | 10/2015 | Watanabe | B60W 10/08 701/22 |
| 2015/0380887 | A1 * | 12/2015 | Jang | H01R 39/12 310/68 R |

FOREIGN PATENT DOCUMENTS

| | | |
|---|---|---|
| JP | 2010-252628 A | 11/2010 |
| JP | 2011-259538 A | 12/2011 |
| JP | 2012-060827 A | 3/2012 |
| JP | 2013-158091 A | 8/2013 |
| WO | 2006/116829 A1 | 11/2006 |

* cited by examiner

VEHICLE

INCORPORATION BY REFERENCE

The disclosure of Japanese Patent Application No. 2014-092689 filed on Apr. 28, 2014 including the specification, drawings and abstract is incorporated herein by reference in its entirety.

BACKGROUND OF THE INVENTION

1. Field of the Invention

The invention relates to a vehicle, and particularly relates to a vehicle that includes a rotary electric machine and an inverter for supplying current to the rotary electric machine.

2. Description of Related Art

A technique of suppressing rupture of an oil film is disclosed in Published Japanese Translation of PCT application No. 2008-539682 (JP 2008-539682 A). More specifically, a parameter that indicates a state of an oil film of a bearing for supporting a rotational shaft of a motor is calculated from torque and a rotational fluctuation of the motor. Then, on the basis of the calculated parameter, a rotational speed of the motor is increased to a specified value.

By the way, it has conventionally been known that a phenomenon called electrolytic corrosion occurs to metals around the motor once the motor is driven. The metals around the motor refer to the bearing for supporting the rotational shaft of the motor and the like. The electrolytic corrosion is a phenomenon that metals around a current circuit are corroded by an intermittent flow of stray current, which is leaked from the current circuit to the outside therearound.

In order to suppress occurrence of the electrolytic corrosion, it is desirable to form an insulation oil film on a surface of each metal around the motor and suppress rupture of the oil film. However, in order to suppress the rupture of the oil film and thereby the occurrence of the electrolytic corrosion, if the rotational speed of the motor is increased to the specified value as described in JP 2008-539682 A, output of the motor may be changed, and thus user request output may not be able to be maintained.

SUMMARY OF THE INVENTION

The invention provides a vehicle that suppresses occurrence of electrolytic corrosion in a peripheral portion of a rotary electric machine while maintaining output of the rotary electric machine at user request output.

A vehicle related to the present invention comprises a rotary electric machine, an inverter and an electronic control unit. The inverter is configured to supply current to the rotary electric machine. The electronic control unit is configured to control the inverter. The electronic control unit is configured to determine whether there is a possibility of occurrence of electrolytic corrosion in a peripheral portion of the rotary electric machine. The electronic control unit is configured to set a control mode of the inverter to a first mode on a condition that the electronic control unit determines that there is no possibility of occurrence of the electrolytic corrosion. The electronic control unit configured to set the control mode of the inverter to a second mode and maintain output of the rotary electric machine at user request output on a condition that the electronic control unit determines that there is a possibility of occurrence of the electrolytic corrosion. The second mode is a mode in which occurrence of the electrolytic corrosion is further suppressed compared to the first mode.

According to such a configuration, if it is determined that the electrolytic corrosion occurs, the control mode of the inverter is switched from the first mode to the second mode. The second mode is a mode in which the occurrence of the electrolytic corrosion is further suppressed compared to the first mode while the output of the rotary electric machine is maintained at the user request output. Thus, occurrence of the electrolytic corrosion can be suppressed while the output of the rotary electric machine is maintained at the user request output.

The electronic control unit may be configured to control the inverter by pulse width modulation control. The second mode may be a mode in which a frequency of a carrier signal is set to a frequency that further suppresses the occurrence of the electrolytic corrosion compared to the first mode and output of the rotary electric machine (M) is maintained at the user request output. The carrier signal may be used for the pulse width modulation control.

According to such a configuration, by changing the frequency of a carrier signal used for the pulse width modulation control of the inverter, the occurrence of the electrolytic corrosion can be suppressed while the output of the rotary electric machine is maintained at the user request output.

The electronic control unit may be configured to estimate strength and stress based on an operation state of the rotary electric machine. The electronic control unit may be configured to determine whether there is a possibility of occurrence of the electrolytic corrosion based on an estimated strength and stress. The strength may indicate resistance strength of the peripheral portion against the electrolytic corrosion. The stress may indicate an electric load applied to the peripheral portion.

According to such a configuration, it is possible to appropriately determine whether the electrolytic corrosion occurs in consideration of both of the resistance strength of the peripheral portion against the electrolytic corrosion (the strength) and the electric load on the peripheral portion (the stress).

The vehicle may be a hybrid vehicle that includes a travel motor and a regenerative generator. The rotary electric machine may be at least one of the travel motor or the regenerative generator.

According to such a configuration, the occurrence of the electrolytic corrosion can be suppressed while the output of the travel motor or the regenerative generator is maintained at the user request output.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
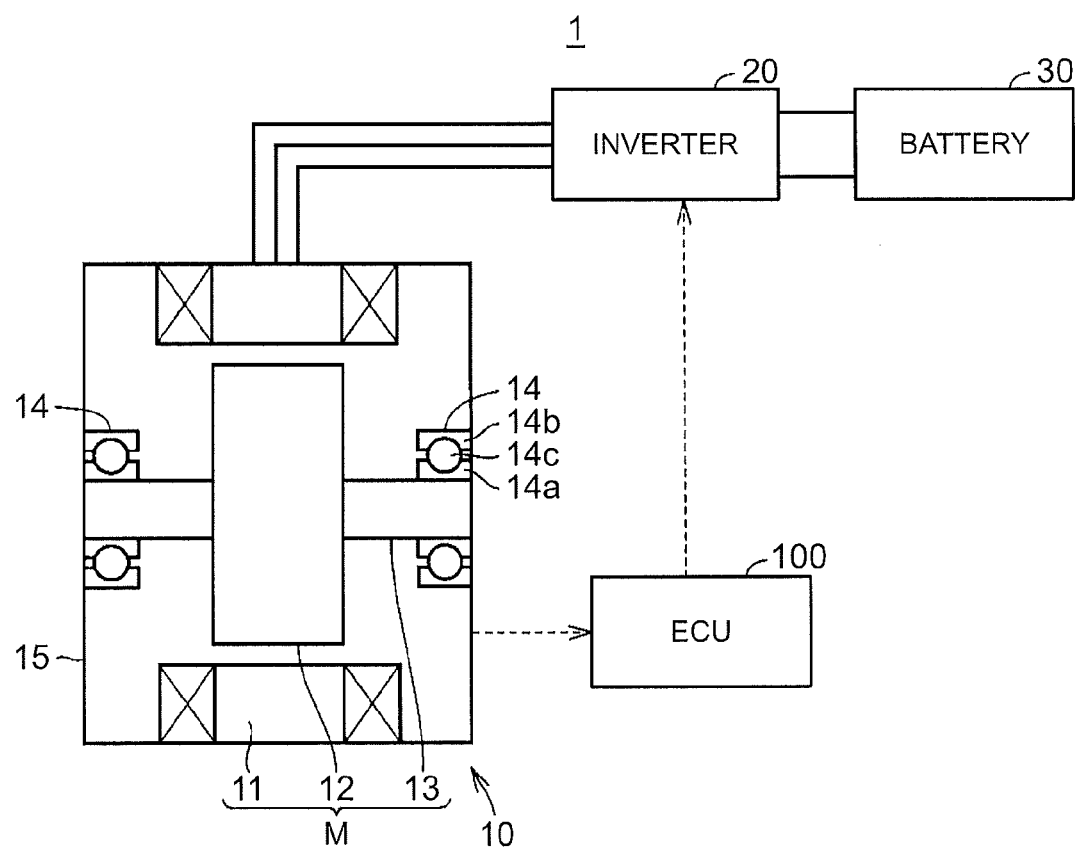
FIG. 1 is a view of a schematic configuration of a vehicle.

A description will hereinafter be made on an embodiment of the invention with reference to the drawings. In the following description, the same components are denoted by the same reference numerals. Names and functions thereof are also the same. Therefore, a detailed description thereof will not be repeated.

FIG. 1 is a view of a schematic configuration of a vehicle 1 according to this embodiment. The vehicle 1 is a hybrid vehicle that can travel by using power of at least one of a motor M (will be described below) and an engine (not shown). In this embodiment, a case where the invention is applied to the hybrid vehicle is exemplified. However, the invention can be applied to all types of electric motor vehicles (including, for example, electric vehicles, fuel cell vehicles, and the like in addition to the hybrid vehicles) that travel by using drive power obtained by electric energy.

The vehicle 1 includes a transaxle 10, an inverter 20, a battery 30, and an electronic control unit (ECU) 100. A motor M and a bearing 14 are provided in the transaxle 10.

The motor M is an alternating-current rotary electric machine and representatively a three-phase (U-phase, V-phase, and W-phase) synchronous motor of permanent magnet type. The motor M primarily functions as a travel motor that generates drive power for traveling the vehicle 1. However, the motor M may primarily function as a regenerative generator that generates electric power for driving a travel motor.

The motor M includes a stator 11, a rotor 12, and a rotational shaft 13. The stator 11 is fixed to a housing 15 of the transaxle 10. The rotor 12 is fixed to the rotational shaft 13 of the motor M.

The bearing 14 rotatably supports the rotational shaft 13 of the motor M to the housing 15. The bearing 14 includes: an inner ring 14a fixed to the rotational shaft 13; an outer ring 14b fixed to the housing 15; and a roller 14c provided between the inner ring 14a and the outer ring 14b.

Oil for cooling the motor M and lubricating actuation of the bearing 14 is circulated in the transaxle 10.

The battery 30 is representatively constructed of a secondary battery such as of nickel-hydrogen or lithium-ion or of a storage device such as an electric double-layered capacitor.

The inverter 20 includes a U-phase arm, a V-phase arm, and a W-phase arm that respectively correspond to each phase of the motor M. Each of the phase arms includes plural switching elements (an upper arm and a lower arm), each of which is controlled by a control signal from the ECU 100.

When the motor M functions as the motor, the inverter 20 converts direct current from the battery 30 to three-phase alternating current and outputs it to the motor M by a switching operation that corresponds to the control signal from the ECU 100. In this way, the motor M is driven.

Meanwhile, when the motor M functions as a generator, the inverter 20 converts the three-phase alternating current that is regenerated by the motor M to the direct current and outputs it to the battery 30 by the switching operation that corresponds to the control signal from the ECU 100. In this way, the battery 30 is charged.

Furthermore, although not shown, the vehicle 1 includes plural sensors for detecting various types of physical quantities that are necessary to control the vehicle 1, such as a resolver for detecting a rotational state of the motor M, a sensor for detecting an oil temperature in the transaxle 10, and a sensor for detecting phase current (U-phase current, V-phase current, W-phase current) flowing into the motor M. These sensors output detection results to the ECU 100.

A central processing unit (CPU) and a memory, which are not shown, are installed in the ECU 100. On the basis of the information stored in said memory and information from each of the sensors, the ECU 100 controls each equipment of the vehicle 1, such as the motor M (the inverter 20).

The ECU 100 controls output of the motor M such that output (the drive power) of the vehicle 1 becomes output requested by a user (hereinafter also referred to as "user request output"). The ECU 100 controls the motor M by pulse width modulation (hereinafter referred to as "PWM") control. In the PWM control, pseudo sine wave voltage is applied to the each phase of the motor M by controlling the switching operation of the inverter 20 in accordance with a comparison result between a carrier signal and a phase voltage command value. Since the PWM control itself is a known technique, a detailed description on the PWM control will not be made.

In the vehicle 1 that has the configuration as described above, when the motor M is driven, phase current flows between the motor M and the inverter 20. This may cause electrolytic corrosion to develop on the bearing 14 that is arranged around a current circuit of the motor M. As already described, the electrolytic corrosion is a phenomenon that metals around a current circuit are corroded by an intermittent flow of stray current, which is leaked from the current circuit to the outside therearound.

In order to suppress occurrence of the electrolytic corrosion of the bearing 14, it is preferred to prevent rupture of an oil film in the bearing 14 (more specifically, an oil film formed between the elements, the roller 14c, the inner ring 14a, and the outer ring 14b of the bearing 14). However, if the output of the motor M is changed in order to suppress the rupture of the oil film, the output (the drive power) of the vehicle 1 may not be able to be maintained at the user request output.

In view of the above, the ECU 100 according to this embodiment performs a process for switching a control mode of the inverter 20, so as to suppress the occurrence of the electrolytic corrosion while maintaining the output of the motor M at the user request output (hereinafter also referred to as a "electrolytic corrosion suppression process").

More specifically, the ECU 100 estimates resistance strength of the bearing 14 against the electrolytic corrosion (hereinafter referred to as "strength") and an electric load applied to the bearing 14 (hereinafter referred to as "stress"). Then, on the basis of the estimated strength and stress, if it is determined that there is a possibility of the occurrence of the electrolytic corrosion, the ECU 100 switches the control mode of the inverter 20 from a normal mode to a electrolytic corrosion suppression mode while maintaining the output of the motor M at the user request output.

Figure 2:
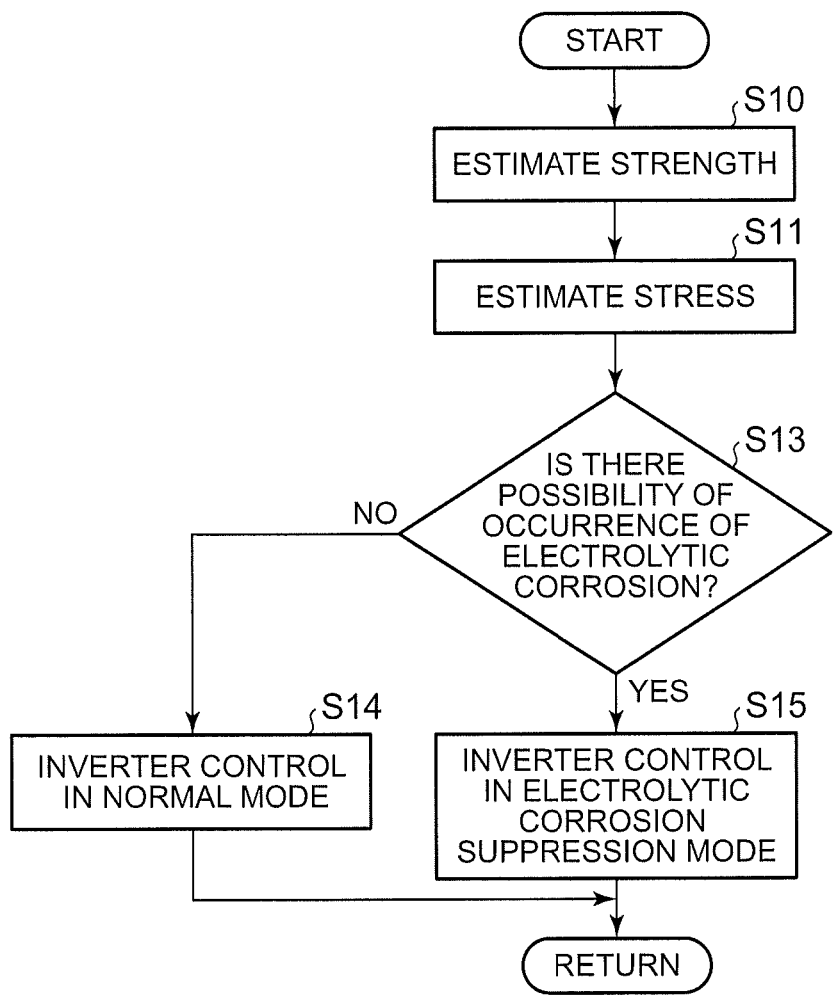
FIG. 2 is a flowchart of a process performed by an ECU.

FIG. 2 is a flowchart of the electrolytic corrosion suppression process performed by the ECU 100. This flowchart is repeatedly executed at specified intervals.

The ECU 100 estimates the strength of the bearing 14 in S10. For example, the ECU 100 estimates a thickness of the oil film in the bearing 14 (hereinafter simply referred to as an "oil film thickness") by using torque and a rotational speed of the motor M as parameters, and then estimates that an insulation property between the elements of the bearing 14 is high and the strength is large (the electrolytic corrosion is less likely to occur) as the estimated oil film thickness is increased.

It should be noted that the oil film thickness can also be estimated by using an oil temperature in the transaxle 10 as a parameter. For example, it can be estimated that oil viscosity is high and the oil film thickness is large as the oil temperature in the transaxle 10 is lowered.

The ECU 100 estimates the stress applied to the bearing 14 in S11. For example, the ECU 100 estimates neutral point voltage and shaft voltage of the motor M from phase voltage of the motor M, and then estimates that the stray current is likely to flow through the bearing 14 and the stress is large (the electrolytic corrosion is likely to occur) as the estimated neutral point voltage and shaft voltage are increased. The neutral point voltage is a potential difference between a neutral point of the motor M and a ground, and the shaft voltage is a potential difference between the rotational shaft 13 of the motor M and the ground.

The ECU 100 determines in S13 whether the electrolytic corrosion of the bearing 14 possibly occurs. The ECU 100 determines that there is a possibility of occurrence of the electrolytic corrosion if the stress estimated in S11 is larger than the strength estimated in S10.

If it is not determined that the electrolytic corrosion possibly occurs (NO in S13), the ECU 100 controls the inverter 20 in the normal mode in S14.

On the contrary, if it is determined that there is a possibility of occurrence of the electrolytic corrosion (YES in S13), the ECU 100 controls the inverter 20 in the electrolytic corrosion suppression mode in S15. The electrolytic corrosion suppression mode is a mode for suppressing the occurrence of the electrolytic corrosion more than the normal mode while maintaining the output of the motor M at the user request output.

In this embodiment, a frequency of the carrier signal (hereinafter referred to as a "carrier frequency") that is used for the PWM control of the inverter 20 is switched in accordance with whether the control mode is the normal mode or the electrolytic corrosion suppression mode.

Figure 3A:
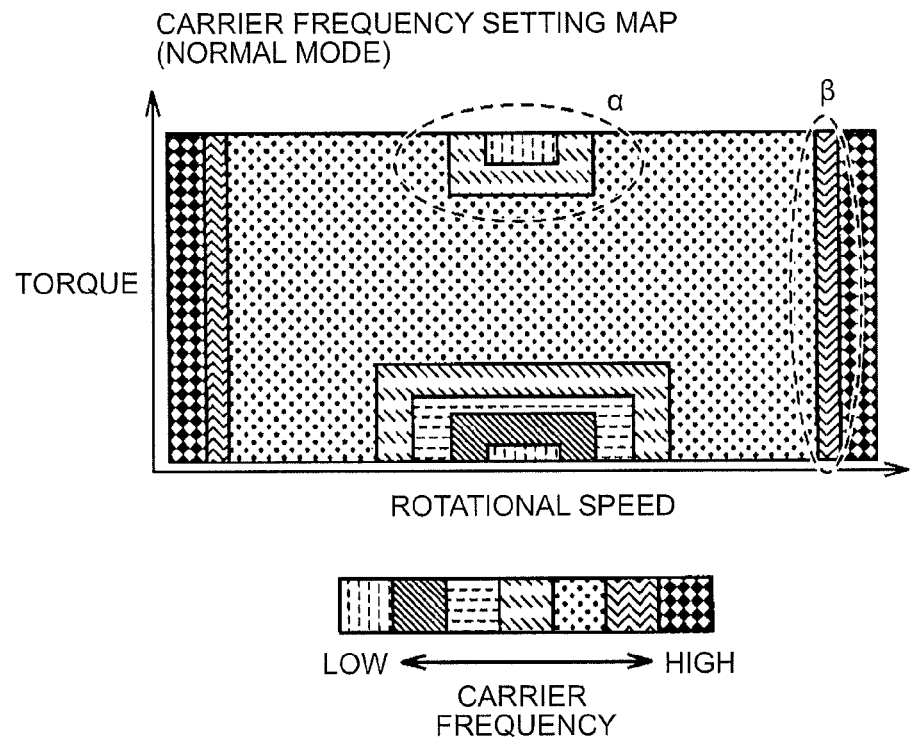
FIG. 3A is a view of an example of a carrier frequency setting map.
Figure 3B:
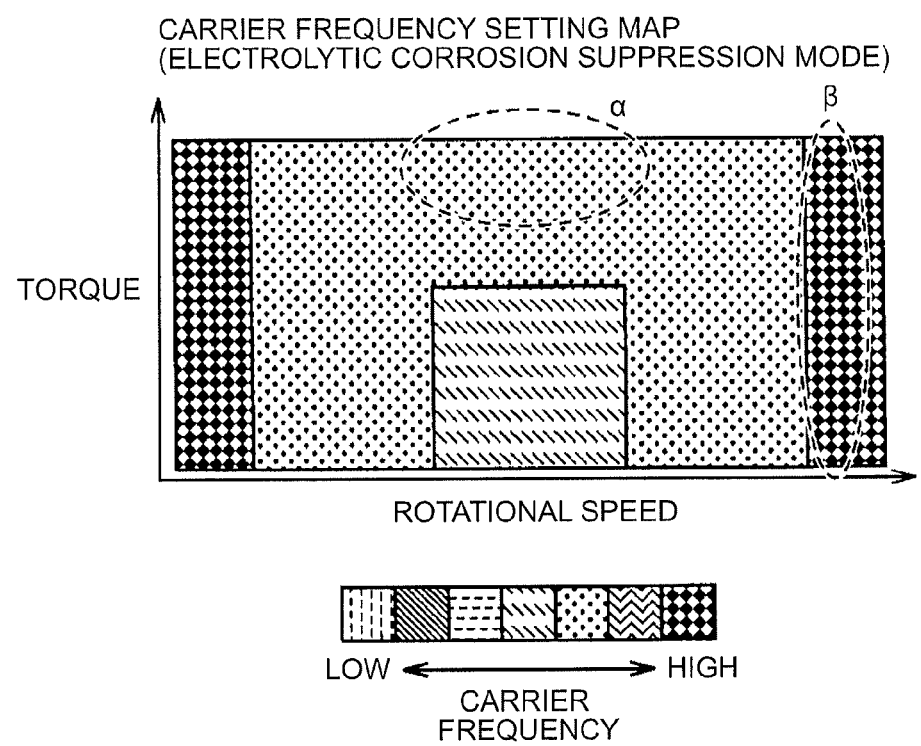
FIG. 3B is a view of another example of the carrier frequency setting map.

FIG. 3 includes views of examples of a map for setting the carrier frequency (hereinafter referred to as a "map"). FIG. 3A shows an example of a map that is used in the normal mode (hereinafter referred to as a "normal mode map"), and FIG. 3B shows an example of a map that is used during the electrolytic corrosion suppression mode (hereinafter referred to as a "electrolytic corrosion suppression mode map").

As shown in FIG. 3A and FIG. 3B, the carrier frequency is set by using the rotational speed and the torque of the motor M as the parameters in both of the normal mode map and the electrolytic corrosion suppression mode map.

In the electrolytic corrosion suppression mode map shown in FIG. 3B, the carrier frequencies in a high torque region α and a high rotational speed region β are set as higher values than those in the normal mode map shown in FIG. 3A.

It has been identified by an experiment and the like that, if the carrier frequencies in the high torque region α and the high rotational speed region β are set in the normal mode map shown in FIG. 3A, frequencies of the neutral point voltage and the shaft voltage of the motor M are included in a frequency region that resonates with the stray current circuit and thus the stray current tends to be increased.

Due to the above reason, the carrier frequencies in the high torque region α and the high rotational speed region β in the electrolytic corrosion suppression mode map shown in FIG. 3B are increased to be larger than those in the normal mode map. Accordingly, the frequencies of the neutral point voltage and the shaft voltage of the motor M are no longer included in the frequency region that resonates with the stray current circuit. Thus, the stray current is suppressed, and the electrolytic corrosion is suppressed. Here, even when the carrier frequency is changed, the output of the motor M is not changed. In other words, the electrolytic corrosion can be suppressed while the output of the motor M is maintained at the user request output.

As it has been described so far, the ECU 100 according to this embodiment estimates the strength and the stress of the bearing 14 and, on the basis of the estimated strength and stress, determines whether there is a possibility of occurrence of the electrolytic corrosion. Then, if it is determined that there is a possibility of occurrence of the electrolytic corrosion, the ECU 100 switches a carrier frequency setting map from the normal mode map to the electrolytic corrosion suppression mode map, so as to suppress the stray current. In this way, the occurrence of the electrolytic corrosion can be suppressed while the output of the motor M is maintained at the user request output.

The above-described embodiment can be modified as follows, for example.

In the above-described embodiment, the example a target to suppress the electrolytic corrosion is the bearing 14 is described. However, instead of the bearing 14, the suppression target of the occurrence of the electrolytic corrosion may be another bearing section or a sliding section in the transaxle 10. In this case, all of the bearing 14 and one of the other bearing section or the sliding section may be set as the target to suppress the electrolytic corrosion.

In the above-described embodiment, the example in which the parameter that is used to estimate the strength is the oil film thickness is described. However, the parameter that can be used to estimate the strength is not limited to this.

For example, the strength may be estimated on the basis of the surface roughness of a transfer surface of the bearing 14 (hereinafter simply referred to as "surface roughness"). For example, as the surface roughness is larger, a metal contact area in the bearing 14 and an energization frequency are increased. Thus, it can be estimated that the strength is small (the electrolytic corrosion is likely to occur). In this case, the surface roughness may be used instead of the oil film thickness to estimate the strength, or both of the oil film thickness and the surface roughness may be used to estimate the strength.

In addition, the strength, which is estimated on the basis of the oil film thickness or the surface roughness, may be corrected according to the oil temperature, a degree of deterioration of the oil, an amount of foreign matters in the oil, or the like. For example, as the oil temperature is increased, the oil viscosity and the oil film thickness are reduced. Thus, it can be estimated that the strength is small. In addition, as the degree of deterioration of the oil or the amount of foreign matters in the oil is increased, the insulation property of the oil film is deteriorated. Thus, the strength can be corrected to be smaller.

In the above-described embodiment, the example in which the parameters used to estimate the stress are the neutral point voltage and the shaft voltage of the motor M is described. However, the parameter that can be used to estimate the stress is not limited to these.

For example, the stress may be estimated on the basis of the current flowing through the motor M or alternating-current electric power (unit: Watt) supplied to the motor M. When the alternating-current electric power supplied to the motor M is used, an effective value of the alternating-current electric power or a maximum value of the alternating-current electric power may be used. When the current flowing through the motor M is used, current density may be used. In this case, the stress may be estimated on the basis of the current flowing through the motor M and the alternating-current electric power supplied to the motor M instead of the neutral point voltage and the shaft voltage of the motor M. In addition, the stress may be estimated on the basis of all of the neutral point voltage and the shaft voltage of the motor M, the current flowing through the motor M, and the alternating-current electric power supplied to the motor M.

In the above-described embodiment, it is determined that there is a possibility of occurrence of the electrolytic corrosion if the stress is larger than the strength. However, a method for determining whether the electrolytic corrosion possibly occurs is not limited to this.

For example, it may be determined that the electrolytic corrosion possibly occurs if the stress is larger than a prescribed value that is determined in advance. Alternatively, it may be determined that there is a possibility of occurrence of the electrolytic corrosion if the stress is smaller than a prescribed value that is determined in advance.

In the above-described embodiment, in the case where it is determined that there is a possibility of occurrence of the electrolytic corrosion, and where the motor M is operated in the high torque region or the high rotational speed region (Condition 1), the carrier frequency is changed to be included in a high frequency region (see above-described FIG. 3). However, a condition for changing the carrier frequency is not limited to this.

For example, in the case where the oil temperature is high (Condition 2) or where an elapsed time period (aged deterioration) exceeds a threshold (Condition 3), it may be determined that the insulation property of the oil film is reduced, and thus the carrier frequency may be changed to the high frequency region. In this case, instead of Condition 1, at least one of Condition 2 and Condition 3 may be used, or all Conditions 1, 2, and 3 may be used.

In the above-described embodiment, the example in which the carrier frequency is changed by the electrolytic corrosion suppression process is described. However, a target to be changed by the electrolytic corrosion suppression process is not limited to the carrier frequency.

For example, a voltage waveform output from the inverter 20 to the motor M may be changed. When a control method of the motor M can be switched to any one of PWM control method, overmodulation PWM control method, square-wave voltage control method, and the electrolytic corrosion may be suppressed by changing the method among these control methods. For example, when an operation point of the motor M is included in a high-output region, the control method of the motor M may be changed from the square-wave voltage control method to the overmodulation PWM control method or from the overmodulation PWM control method to the PWM control method. By changing the control method of the motor M just as described, the output voltage waveform of the motor M is changed, and thus a degree of current waveform distortion can be minimized. In this way, instantaneous peak voltage and peak current are suppressed. Therefore, the electrolytic corrosion can be suppressed.

In addition, the operation point of the motor M may be changed. In other words, when the operation point of the motor M is included in the high-output region where the electrolytic corrosion is likely to occur, at least the torque or the rotational speed of the motor M is reduced. In this way, the stress is reduced, and the electrolytic corrosion can be suppressed. It should be noted that, when the output of the motor M is reduced, a reduced amount may be compensated by output of the engine. When the reduced amount of the output of the motor M cannot be compensated by output of the engine, suppression of the electrolytic corrosion may be prioritized, and drive power of the vehicle 1 may be limited.

The above-described embodiment and the modifications thereof can appropriately be combined within a range that technical contradiction does not arise.

It should be understood that the embodiment disclosed herein is merely illustrative and not restrictive. The scope of the invention is defined by the claims rather than by the above description, and it is intended to include all modifications falling within the scope of the claims and equivalents thereof.

What is claimed is:

1. A vehicle comprising:
a rotary electric machine;
an inverter configured to supply current to the rotary electric machine; and
an electronic control unit configured to control the inverter, the electronic control unit configured to determine whether there is a possibility of occurrence of electrolytic corrosion in a peripheral portion of the rotary electric machine, the electronic control unit configured to set a control mode of the inverter to a first mode on a condition that the electronic control unit determines that there is no possibility of occurrence of the electrolytic corrosion, the electronic control unit configured to set the control mode of the inverter to a second mode and maintain output of the rotary electric machine at user request output on a condition that the electronic control unit determines that there is a possibility of occurrence of the electrolytic corrosion, and the second mode being a mode in which occurrence of the electrolytic corrosion is further suppressed compared to the first mode.

2. The vehicle according to claim 1, wherein
the electronic control unit is configured to control the inverter by pulse width modulation control,
the second mode is a mode in which a frequency of a carrier signal is set to a frequency that further suppresses the occurrence of the electrolytic corrosion compared to the first mode and output of the rotary electric machine is maintained at the user request output, and
the carrier signal is used for the pulse width modulation control.

3. The vehicle according to claim 1, wherein
the electronic control unit is configured to estimate strength and stress based on an operation state of the rotary electric machine, the electronic control unit is configured to determine whether there is a possibility of occurrence of the electrolytic corrosion based on an estimated strength and stress,
the strength indicates resistance strength of the peripheral portion against the electrolytic corrosion, and
the stress indicates an electric load applied to the peripheral portion.

4. The vehicle according to claim 1, wherein
the vehicle is a hybrid vehicle that includes a travel motor and a regenerative generator, and
the rotary electric machine is at least one of the travel motor or the regenerative generator.

* * * * *